United States Patent
Weiss

[15] 3,690,406
[45] Sept. 12, 1972

[54] EXHAUST NOISE SILENCER
[72] Inventor: Leopold Weiss, 2830 N.W. 23rd Ave., Miami, Fla. 33142
[22] Filed: Dec. 4, 1970
[21] Appl. No.: 95,132

[52] U.S. Cl. .................. 181/36 B, 181/53, 181/60, 181/69, 181/72
[51] Int. Cl. ........................ F01n 1/08, F01n 7/08
[58] Field of Search ....... 181/35, 36, 36.2, 41, 49, 53, 181/72, 68–70, 36.4, 60

[56] References Cited

UNITED STATES PATENTS

| | | | |
|---|---|---|---|
| 1,366,632 | 1/1921 | Carlen | 181/72 UX |
| 1,388,554 | 8/1921 | Dubben et al. | 181/70 X |
| 1,729,018 | 9/1929 | Siders | 181/72 UX |
| 2,108,671 | 2/1938 | Kato | 181/72 UX |
| 2,512,155 | 6/1950 | Hill | 181/70 X |
| 2,609,886 | 9/1952 | Harmon | 181/72 UX |
| 2,631,614 | 3/1953 | Stephens | 181/53 UX |

FOREIGN PATENTS OR APPLICATIONS

| | | | |
|---|---|---|---|
| 5,243 | 1908 | Great Britain | 181/53 |
| 341,420 | 3/1922 | Germany | 181/53 |
| 210,488 | 2/1924 | Great Britain | 181/70 |
| 268,085 | 3/1927 | Great Britain | 181/72 |
| 540,632 | 3/1956 | Italy | 181/36.4 |

*Primary Examiner*—Robert S. Ward, Jr.
*Attorney*—Barry L. Haley

[57] ABSTRACT

An exhaust noise silencer for use on a combustion engine or the like in which an open tube having a plurality of equilength segments disposed perpendicular to adjacent segments in a series in respect to the axial length of the tube is coupled to the exhaust pipe of the engine.

2 Claims, 3 Drawing Figures

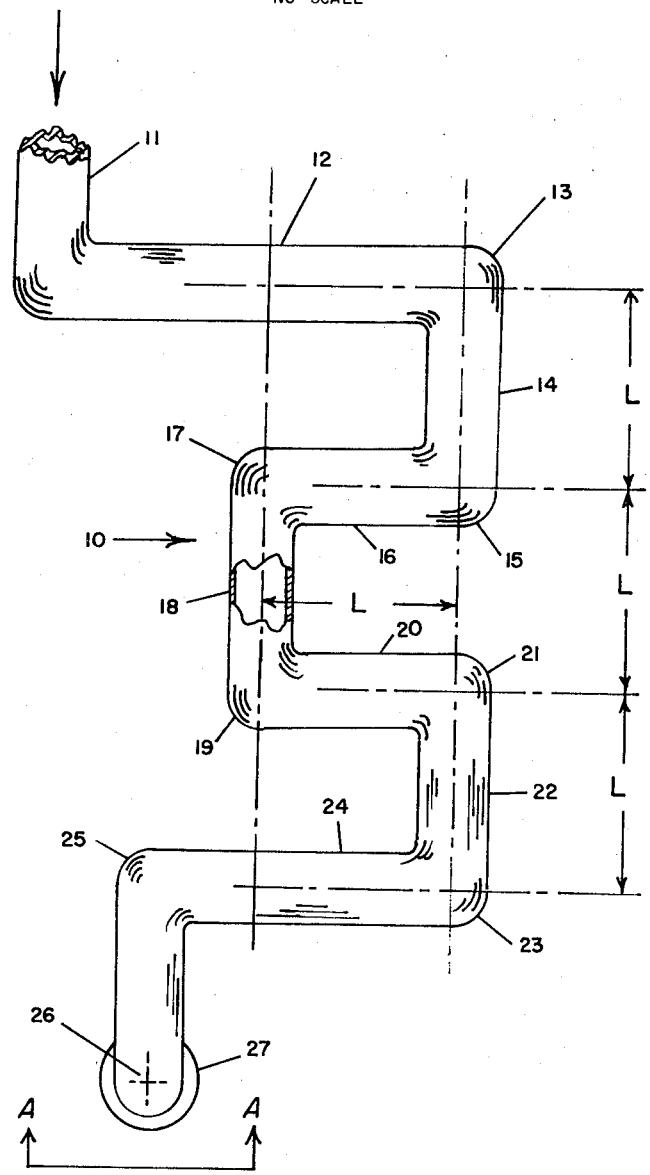
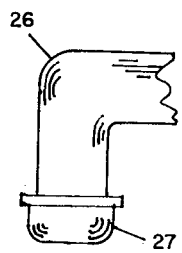
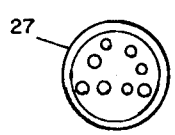
PATENTED SEP 12 1972　3,690,406
FIGURE 1
NO SCALE
LEOPOLD WEISS
INVENTOR
FIGURE 2A
FIGURE 2B

EXHAUST NOISE SILENCER

BACKGROUND OF THE INVENTION

Increasing noise pollution caused from the vast number of combustion engines in our environment has created a need for an improved combustion exhaust silencing device. In the past, such devices have been shown having elaborate baffling chambers, interior duct panels and a myriad of other complicated acoustic absorbing channel works. Such devices are expensive to build and sell.

Applicant's invention relates in general to a combustion exhaust silencer having no internal baffle arrangements, but being a tube arranged in a particular path with a partially open outlet end. A combustion engine exhaust generates a flow of hot gases which carry engine explosion noises from the cylinder chambers. It is believed that in the operation of applicant's invention, the exhaust sound waves are attenuated by wave reflection patterns forming in the open tube because of the tube configuration.

BRIEF DESCRIPTION OF THE INVENTION

An exhaust gas silencer for coupling to the exhaust pipe of a combustion engine or the like comprising a tube having the inlet end coupled to said exhaust pipe and an outlet end, a cover having a plurality of holes, and coupled over said outlet end, the tube being shaped axially in a plurality of equilength segments, with each segment joined perpendicularly to an adjacent segment along the axially length of the tube defined by a line joining the inlet end and the outlet end. The silencer may also be used in conjunction with other exhaust resonating means.

It is an object of this invention to provide an improved combustion engine exhaust silencer.

It is another object of this invention to provide an exhaust silencer having no internal baffle arrangement.

And yet another object of this invention is to provide an exhaust gas silencer that is non-complex in construction or operation.

BRIEF DESCRIPTION OF THE DRAWINGS

FIG. 1 is a plan view of the invention having a partial cut-away section;

FIG. 2A is a side view and FIG. 2B is end on view of the outlet end of applicant's invention.

PREFERRED EMBODIMENT OF THE INVENTION

Referring now to the drawing and in particular to FIG. 1, applicant's exhaust silencer is shown as a cylindrical pipe 10, having a plurality of U-shaped sections all lying in the same plane. Dashed lines are used to show the respective lengths of U-shaped portion members. Straight tube segments 12, 16, 20 and 24 are equal in length (L) 5½ inches) and are parallel, as are perpendicular straight tube segments 14, 18 and 22 which are also of length (L) (5½ inches). Elbow sections 13, 15, 17, 19, 21 and 23 allow for a perpendicular joinder of adjacent U-shaped legs. A cut-away section in straight segment 18 shows the pipe interior as an unobstructed channel. Adjacent U-shaped sections are mirrored in direction to provide what appears in FIG. 1 as an S-shaped design. The inlet opening 11, is tightly fitted to the combustion engine exhaust system (not shown) so that no gases escape around the opening 11. The lead in segment with opening 11 adjacent segment 12 may be sized to accommodate the particular system, but for best operating results should be limited to 0.35L (from elbow at opening 11 to beginning of segment 12).

FIG. 2 shows the outlet tube end having a cover 27 with a plurality (eight) of small holes which permit the gas under pressure to exit. The end segment 26 is shown as an elbow and extension directed into the plane of the paper. Elbow section 25 couples the outlet end 27 to the equilength U-shaped segments. The particular direction of the outlet opening is not considered crucial to the invention, but the preferred embodiment is shown as being suitable for use on an automobile exhaust system and disposed laterally underneath the rear section of the auto with the outlet end facing rearward. FIG. 2 shows the end segment 26 and cover 27 along vertical lines A—A of FIG. 1.

In operation noisy exhaust gas enters the silencer tube 10, through opening 11 and is directed through the series of U-shaped, equal length segments, and then leaving the tube through the apertures in cover 27. It has been found that this arrangement significantly reduces exhaust noises.

The exhaust tube 10 diameter may be chosen so as to be compatible with the engine system and in the preferred embodiment is about 0.27L in diameter. Although three U-shaped sections have been shown in the preferred embodiment, it is believed that changing the number (above at least two) would accomplish the same result.

The exhaust silencer may be attached directly to an automobile exhaust manifold system or it may be used in conjunction with a muffler system to further reduce noise. Although shown as being constructed of one unitary tube, the device may be assembled from pipe segments by coupling straight pipe segments together with perpendicular elbow segments.

The specific length of the equilength segments may be varied from that shown in the preferred embodiment of 5½ inches to accommodate various engine sizes in cubic displacement, back pressure desired and the level of acceptable noise.

The instant invention has been shown and described herein in what is considered to be the most practical and preferred embodiment. It is recognized, however, that departures may be made therefrom within the scope of the invention and that obvious modifications will occur to a person skilled in the art.

What I claim is:

1. An exhaust gas silencer comprising:

An elongated tube of substantially uniform diameter having a plurality of straight, substantially equilength segments, including a first segment, a second segment, a third segment, a fourth segment, a fifth segment, a sixth segment, and a seventh segment, said first segment adjacent and perpendicular to said second segment, said second segment adjacent and perpendicular to said third segment, said first and third segments being parallel and disposed in a side-by-side relationship, said fourth segment adjacent and perpendicular to said third segment, said fifth segment adjacent and perpendicular to said fourth segment, said third and fifth segments being parallel and disposed in a side-bymside relationship, said sixth segment adjacent and perpendicular to said fifth segment, said second segment and said sixth segment disposed about a common axis, said seventh adjacent and perpendicular to said sixth segment, said fifth and seventh segments being parallel and disposed in a side-by-side relationship, said tube having an inlet opening end coupled to said first segment and an exhaust opening end coupled to said seventh segment, all of said segments lying in the same plane.

2. An exhaust gas silencer as in claim 1, wherein:
All of said equilength segments are of length L, and said tube diameter being substantially 0.27L.

* * * * *